US011816769B2

(12) United States Patent
Hou et al.

(10) Patent No.: US 11,816,769 B2
(45) Date of Patent: Nov. 14, 2023

(54) MULTI-DIMENSIONAL DATA INSIGHT INTERACTION

(71) Applicant: MICROSOFT TECHNOLOGY LICENSING, LLC, Redmond, WA (US)

(72) Inventors: Zhitao Hou, Beijing (CN); Haidong Zhang, Beijing (CN); Dongmei Zhang, Beijing (CN); Rui Ding, Beijing (CN); Shi Han, Beijing (CN)

(73) Assignee: MICROSOFT TECHNOLOGY LICENSING, LLC, Redmon, WA (US)

( * ) Notice: Subject to any disclaimer, the term of this patent is extended or adjusted under 35 U.S.C. 154(b) by 622 days.

(21) Appl. No.: 15/739,139

(22) PCT Filed: Jun. 29, 2015

(86) PCT No.: PCT/CN2015/082631
§ 371 (c)(1),
(2) Date: Dec. 21, 2017

(87) PCT Pub. No.: WO2017/000111
PCT Pub. Date: Jan. 5, 2017

(65) Prior Publication Data
US 2020/0051293 A1    Feb. 13, 2020

(51) Int. Cl.
*G06F 16/904*       (2019.01)
*G06T 11/20*        (2006.01)
(Continued)

(52) U.S. Cl.
CPC .......... *G06T 11/206* (2013.01); *G06F 3/0482* (2013.01); *G06F 3/04845* (2013.01); *G06F 3/04847* (2013.01); *G06F 16/904* (2019.01)

(58) Field of Classification Search
CPC .... G06T 11/206; G06F 16/904; G06F 3/0482; G06F 3/04845; G06F 3/04847
(Continued)

(56) References Cited

U.S. PATENT DOCUMENTS

| 7,900,160 | B2 | 3/2011 | Moody et al. |
| 8,370,181 | B2 | 2/2013 | Shah-Hosseini |

(Continued)

FOREIGN PATENT DOCUMENTS

| CN | 102902498 A | 1/2013 |
| CN | 103229198 A | 7/2013 |

OTHER PUBLICATIONS

"First Office Action Issued in Chinese Patent Application No. 201580064510.8", dated Aug. 29, 2019, 15 Pages.
(Continued)

*Primary Examiner* — Jin Ge (57) ABSTRACT

A computing apparatus of an insight interfacing system receives from a user a request for a dataset comprising a plurality of subspaces of a multi-dimensional data structure. Insights are received based on the received request then presented on a display device. Also, a chart may be presented based on the received request. The computing apparatus receives a selection of at least a portion of the presented one or more insights or a portion of the chart, then receives contextual insights based on the selected portion and presents the contextual insights on the display device.

20 Claims, 8 Drawing Sheets

(51) Int. Cl.
  *G06F 3/04845* (2022.01)
  *G06F 3/04847* (2022.01)
  *G06F 3/0482* (2013.01)
(58) Field of Classification Search
  USPC ........................................................ 345/440
  See application file for complete search history.

(56) References Cited

U.S. PATENT DOCUMENTS

| | | | |
|---|---|---|---|
| 2009/0319931 A1 | 12/2009 | Hutchings et al. | |
| 2010/0175019 A1 | 7/2010 | Sitton et al. | |
| 2010/0231595 A1* | 9/2010 | Dang | G06F 16/904 345/440 |
| 2011/0154192 A1* | 6/2011 | Yang | G06F 40/197 715/256 |
| 2012/0137238 A1 | 5/2012 | Abeln | |
| 2013/0091132 A1* | 4/2013 | Khalatov | G06Q 10/063118 707/732 |
| 2013/0097481 A1* | 4/2013 | Kotler | G06F 3/0482 715/230 |
| 2013/0144813 A1 | 6/2013 | Sengupta et al. | |
| 2013/0187926 A1* | 7/2013 | Silverstein | G06F 16/972 345/440 |
| 2013/0275905 A1 | 10/2013 | Bhaskaran et al. | |
| 2014/0049557 A1* | 2/2014 | Hou | G06F 3/0481 345/629 |
| 2014/0101780 A1* | 4/2014 | Zuber | G06Q 30/04 726/28 |
| 2014/0152667 A1* | 6/2014 | Li | G06T 1/00 345/440 |
| 2014/0156639 A1 | 6/2014 | Shridhar et al. | |
| 2014/0258311 A1 | 9/2014 | Hamborg et al. | |
| 2014/0282184 A1 | 9/2014 | Dewan et al. | |
| 2015/0039537 A1 | 2/2015 | Peev et al. | |
| 2015/0049087 A1 | 2/2015 | Chaturvedi et al. | |
| 2015/0074145 A1* | 3/2015 | Homer | G06F 16/93 707/772 |
| 2015/0254369 A1* | 9/2015 | Hou | G06F 3/0486 707/798 |
| 2016/0117373 A1* | 4/2016 | Dang | G06F 16/287 707/634 |
| 2017/0177559 A1* | 6/2017 | Dang | G06Q 10/063 |

OTHER PUBLICATIONS

"Search Report Issued in European Patent Application No. 15896642. 4", dated Oct. 15, 2018, 7 Pages.
International Search Report and Written Opinion for PCT/CN2015/ 082631, dated Apr. 1, 2016.
Aisch, Gregor, "Using Data Visualization to Find Insights in Data", Retrieved from: https://datajournalism.com/read/handbook/one/ understanding-data/using-data-visualization-to-find-insights-in-data, Retrieved Date: Mar. 30, 2020, 11 Pages.
Khupat, et al., "Data Warehouse Augmentation, Part 4: Use Big Data Technologies for Initial Data Exploration", Retrieved from: https://www.ibm.com/developerworks/library/ba-augment-data-warehouse4/, Jul. 1, 2014, 7 Pages.
Miller, Chance, "Google adds Treemaps to Acquisition section of Analytics", Retrieved from: https://9to5google.com/2015/03/05/ treemaps-acqusition-adwords/, Mar. 5, 2015, 4 Pages.
"Office Action Issued in European Patent Application No. 15896642. 4", dated Jun. 9, 2020, 9 Pages.
"Office Action Issued in Chinese Patent Application No. 201580064510. 8", dated Jun. 2, 2020, 15 Pages.
"Summons to Attend Oral Proceedings Issued in European Patent Application No. 15896642.4", Mailed Date: Sep. 15, 2021, 9 Pages.
"Office Action Issued in Chinese Patent Application No. 201580064510. 8", dated Nov. 3, 2020, 7 Pages.

* cited by examiner

MULTI-DIMENSIONAL DATA INSIGHT INTERACTION

CROSS-REFERENCE TO RELATED APPLICATION

This application is a U.S. National Stage Application of PCT/CN2015/082631, filed Jun. 29, 2015, which application is hereby incorporated by reference. To the extent appropriate, a claim of priority is made to the above disclosed application.

BACKGROUND

Data exploration is essential to insight discovery, but without appropriate guidance, it is challenging to reach insights efficiently. The inefficiencies are a result of the exploration space being quite large, lack of user familiarity with the subject matter of the data, and manual slicing-and-dicing on the data being labor-intensive. Most existing tools only return the result as users specifically asked for during a data exploration process. The interaction between these tools and the users is unidirectional—users specify a visualization based on corresponding analysis task and request the data from the system to populate this visualization. Thus, users may spend vast amounts of time and effort attempting to discover useful insights from the visualizations and still miss many more useful insights.

SUMMARY

Concepts and technologies are described herein for providing an interface for allowing user to visualize insights mined from multi-dimensional data based on a user defined selection of a dataset or a selection of portions of a visualized insight of the dataset.

An example computing device that provides the interfacing capabilities includes a processor and a memory having computer-executable instructions stored thereupon. The computer-executable instructions, when executed by the processor, cause the computing device to access multi-dimensional data, present manually and automatically-created insights related to data subspaces within a dataset.

In another example, a user selection of at least a portion a visualization associated with an insight is received. Then, further insights are presented based on data subspace(s) associated with the selected visualization.

Multi-dimensional data analysis with auto insights, specifically by using insights that are automatically mined provide hints, guides, and proceed the analysis flow, in hope of approaching desirable analysis results more quickly. Desirable insights may be knowledge discovered from the data being analyzed, as natural building block of analysis flow and resultant report. Desirable insights may be informative as either surprising/interesting/important facts or supporting/explanatory facts, as hints and clues to seamlessly connect and interact with data exploration.

It should be appreciated that the above-described subject matter may also be implemented as a computer-controlled apparatus, a computer process, a computing system, or as an article of manufacture, such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The accompanying drawings, which are incorporated in and constitute a part of this disclosure, illustrate various examples of the present invention. In the drawings.

DETAILED DESCRIPTION

Concepts and technologies are described herein for presenting an interactive interface for allowing users to interact with insights associated with complex multi-dimensional data and to identify insights of subspaces within a dataset(s) of the multi-dimensional data.

Data exploration without appropriate guidance presents a challenge when attempting to efficiently and effectively identify insights in vast amounts of data organized in a multi-dimensional database.

Overview

A computing device receives a request for a dataset that includes a plurality of subspaces of a multi-dimensional data structure. The computing device generates insights or a third party computing systems sends insights to the computing device based on the request. The insights are presented on a display device associated with the computing device. The computing device receives a selection of a portion of one of the presented insights or visualization of the underlying dataset. In response to receiving the selection, other contextual insights are presented with a textual description and a visualization portion.

The selection of the portion of the insight or visualization includes receiving a user interface action related to the insight or visualization and placing the first one of the one or more insights or a portion of visualization associated with the insight in an exploration area in response to receiving the action. The placing includes presenting an image representing a portion of the subspaces associated with the first one of the one or more insights. The image includes one or more data points, wherein the one or more data points correspond to the subspaces associated with the first one of the one or more insights. The selection of the portion of the presented insights or visualization includes receiving a selection of the one or more data points.

The following detailed description refers to the accompanying drawings. Wherever possible, the same reference numbers are used in the drawing and the following description to refer to the same or similar elements. While implementation may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Multi-dimensional data is conceptually organized in a tabular format (i.e., multi-dimensional table) that includes a set of records as rows in the table, and each record is represented by a set of properties as columns in the table.

The multi-dimensional data includes two types of columns—dimension and measure. In general, dimension column and measure column are mutually exclusive, which means a column in a multi-dimensional table will be either a dimension or a measure but not both.

Dimensions represent basic and intrinsic properties of records in the table, e.g., "Brand" and "Year" for a car sales dataset. Dimensions are used to group and filter the records, based on equality and inequality of the dimension values. Dimensions fall into two major types according to their value domains—categorical and ordinal. Specifically, a categorical dimension takes categorical values (e.g., "Brand" for car sales), while an ordinal dimension takes ordinal values (e.g., "Year" for car sales).

Categorical and ordinal are used to categorize dimensions mainly for characterizing their intrinsic ability to reflect ordering, but not to limit their usage scenarios. There may be ordinal dimensions with non-numerical values (e.g., an "Age" dimension could also take "Infants", "Children", "Teens", and etc. as values). When ordering is not an important aspect in the analysis task, ordinal dimensions may be used just as categorical dimensions.

For records, measures reflect attached and quantitative properties that are related to the analysis task (e.g., "Sales" and "Profit" for the car sales dataset). The values in measure columns are typically numerical values.

For a dataset, subspace is a concept representing a subset of records. Specifically, a subspace is defined by a set of <dimension: value> pairs as filtering constraint, and the subspace contains exactly all the records that satisfy the filtering constraint in the given dataset. For a given dataset, there is a special subspace with no filtering constraint in its definition, denoted as the subspace that includes all the records in the given dataset.

Figure 1:
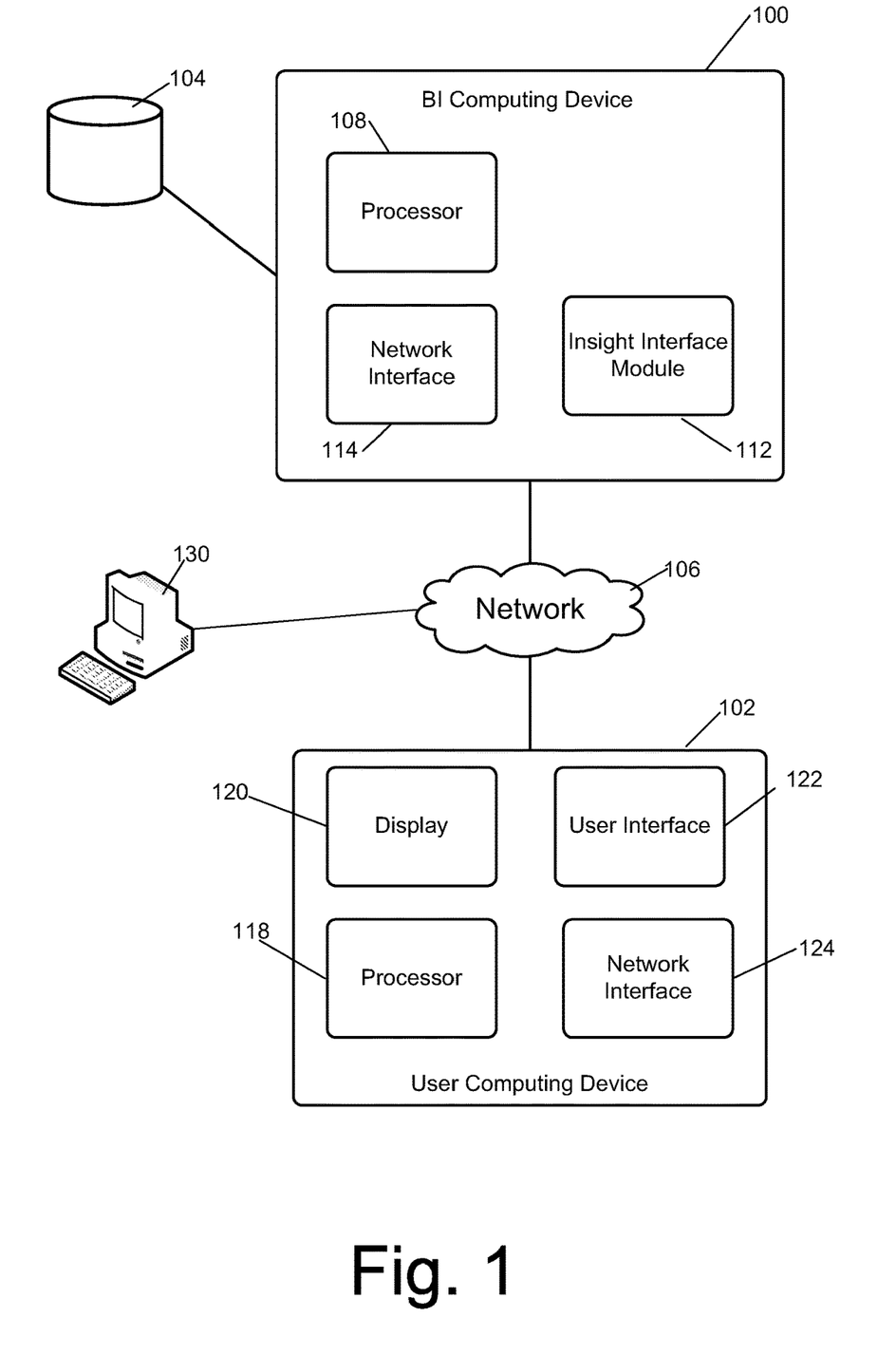
FIG. 1 is a block diagram of an example system for automatically identifying insights from a dataset and presenting the insights ranked by importance.

Referring now to the drawings, in which like numerals represent like elements, various examples will be described. FIG. 1 is a block diagram illustrating a system architecture with components for allowing user interaction with identified insights of a dataset(s) in a corpus of multi-dimensional data (i.e., multi-dimensional data structure). The system architecture includes a business intelligence (BI) computing device 100 and a user computing device 102. The BI computing device 100 may be one of a variety of suitable computing devices described below with reference to FIG. 7. For example, the BI computing device 100 or the user computing device 102 may include a tablet computing device, a desktop computer, a mobile communication device, a laptop computer, a laptop/tablet hybrid computing device, a gaming device, or other type of computing device for performing a variety of tasks.

The BI computing device 100 may include a processor 108, a network interface 114 and an insight interface module 112. A data store 104 includes one or more multi-dimensional data structures. The data store 104 may be accessed by the BI computing device 100 via the network 106 or another network. The user computing device 102 may include a processor 118, a display device 120, a user interface 122 and a network interface 124. The network interfaces 114, 124 allow the respective computing devices to communicate with each other or other computing devices over the network 106, such as a public or private data network.

A user of the user computing device 102 may request access to a dataset(s) of a multi-dimensional data structure stored in the data store 104. This request may be in the form of interaction with a webpage produced by the processor 108 executing the insight interface module 112. Insights associated with the requested dataset are presented to the user via the display device 120. The presented insights include a graphical component having elements linked to a subspace(s) of the requested dataset. After the user selects an element of the graphical component, insights associated with subspaces of the dataset are presented to the user based on the user selected data. The insight interaction is described by examples in detail below.

Figure 2:
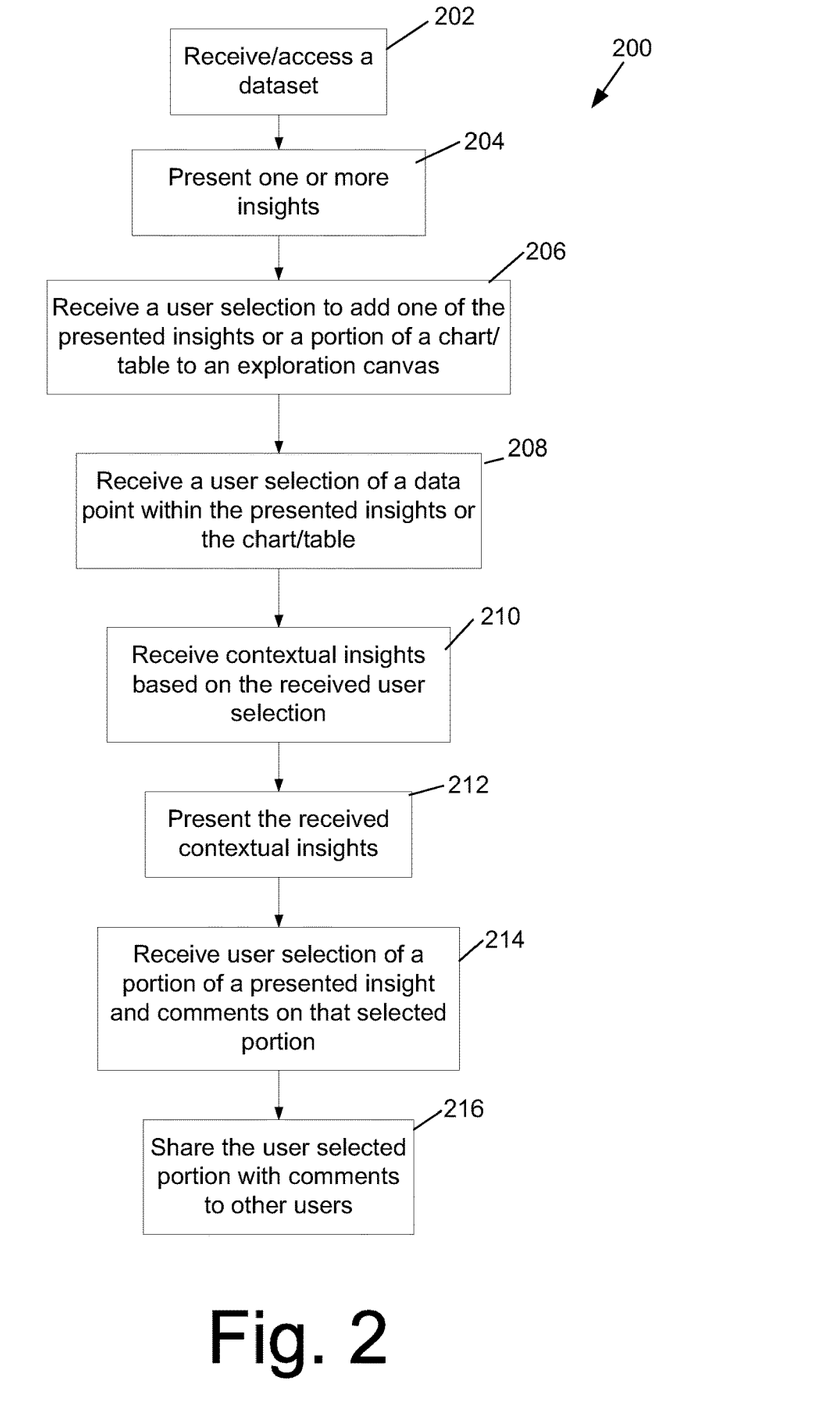
FIG. 2 is a flow chart of an example method for providing an interactive experience regarding insights of datasets of multi-dimensional data.

With reference to FIG. 2, aspects of the routine 200 is shown for providing an interactive experience with insights related to a dataset of multi-dimensional data. First, at operation 202, a dataset is received or accessed. Multiple datasets may be accessed. The multi-dimensional data structure may be stored at the data store 104 or at another remote storage location. The processor 108 may identify datasets of the multi-dimensional data structure that are available for exploration. The processor 108 may present the available datasets in an output format, for example a webpage, accessible by the user computing device 102. A user operating the user interface 122 on the user computing device 102 to control a cursor or other display tool identifies an available dataset of a multi-dimensional data structure that the user desires to explore.

At operation 204, a chart/table of the dataset and/or one or more insights are presented on a page at the display device 120 of the user computing device 102 after the user has selected an available dataset. The chart/table that are presented are directly associated with content of the selected dataset. The insights that are presented are directly associated with content of the selected dataset. The insights may include text and a chart/table visualization. The insights may have been automatically mined from the dataset by the BI computing device 100 or may have been entered by other users at other user computing devices. The insights may be presented in various formats, such as a comic strip style view or a treemap tile view. See FIG. 3 as an example. The insights are presented in a suggested insights area, tab or page or a graphical user interface generated by the insight interface module 112.

Figure 3:
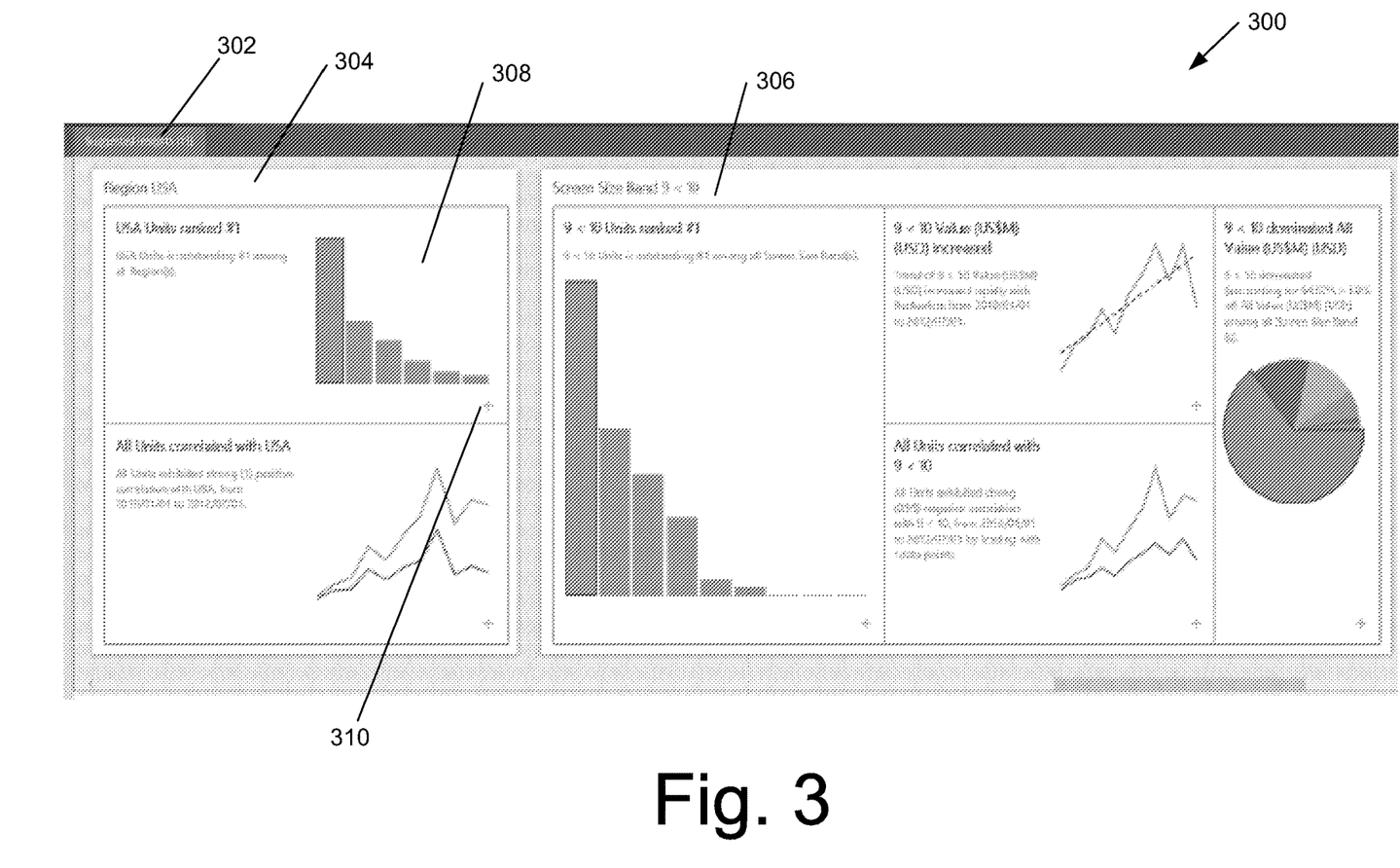
FIG. 3 shows a screenshot of an example interactive interface page generated by components of the devices shown in FIG. 1.

The comic strip style view presents insight windows adjacent to one another, whereby the insights in the adjacent windows may be unrelated to each other. The treemap tile view presents insight windows adjacent to one another, whereby the insights in the adjacent windows are related to each other, such as by topic.

At operation 206, the user selects one or more of the presented insights or at least a portion of the chart/table for inclusion in an exploration canvas. The exploration canvas may be a separate page or tab produced by the insight interface module 112. After a selected insight is added to the exploration canvas (e.g. via drag-and-drop interaction), a selected insight includes a corresponding graphical component (i.e., visualization) that is expanded in comparison to an initial presentation of the insight. The selected insight is added to the exploration canvas adjacent to other insights previously added to the exploration canvas. The graphical component includes elements (e.g., charts or tables) that directly link to data subspaces of the dataset. The data subspaces are a subject of the insight. The directly linked elements and graphical component may be presented in various formats, such as, but not limited to, a pie chart, a bar graph, a timeline, or other graphical representation.

Next, at operation 208, the user makes a selection of one or more elements of the graphical component or an element of the chart/table. The element selection is transmitted to the insight interface module 112.

Then, at operation 210, in response to receiving the user element selection, the insight interface module 112 identifies other insights associated with the element selected. These other insights have context with the subspace associated with the user selected element. Then, these other insights are returned to the user computing device 102.

At operation 212, the other insights are presented in the exploration canvas. The operations 206-212 may be repeated with regard to the presented other insights. This allows a user to drill down the find insights within insights.

At operation 214, the user may select a portion (group of elements) of the graphical component of an insight in the exploration canvas and enter an insight for that selected portion. The entered insight is saved by the BI computing device 100 for sharing with other users upon exposing the data subspaces associated with the insight, see operation 216.

FIG. 3 shows a screen shot of an example graphical user interface (GUI) 300 presenting a suggested insights page 302. The suggested insights page 302 is presented on the display device 120 in response to a user selecting a dataset for exploring. In this example, the suggested insights page 302 presents two groups of insights. A first group 304 includes two insights 308, 310 both related to data subspaces associated with the topic Region USA. A second group 306 includes insights associated with the topic Screen Size Band 9<10. Located at a lower corner of each insight is an exploration canvas selection item 310. Upon a user activating the exploration canvas selection item 310, the associated insight is added to an exploration canvas provided by the GUI. There may be other ways a user can add an insight to the exploration canvas. For example, the user may drag and drop an insight onto the exploration canvas, which may be in the form of a button, a display area or a tab.

Figure 4:
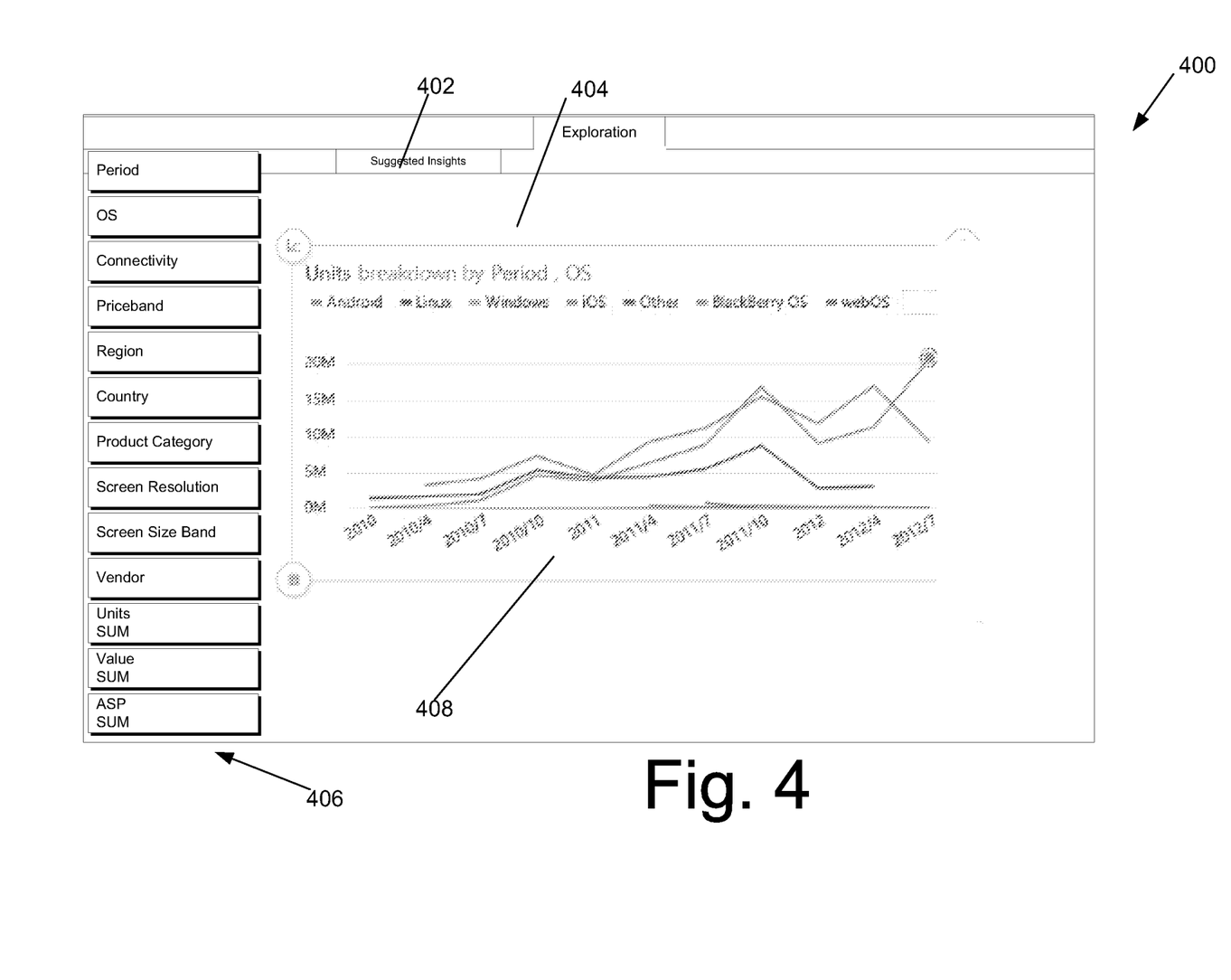
FIG. 4 shows a screenshot of an exploration canvas as a user interface made accessible to a user computing device.

FIG. 4 shows an example exploration canvas 402 presented in a web page 400. The exploration canvas 402 includes a first area 404 for presenting previously identified insights and a second area 406 that includes dimensions and measures. When the user selects a dimension or measure (e.g. drag a dimension/measure of interest to the canvas) a new visualization related to that dimension or measure is created. In this example, a chart 408 titled Units breakdown by Period—OS is presented in the first area 404. The chart 408 may be a visualization/chart created from an insight (the visualization associated with an insight to present the insight), or a visualization/chart created by the user manually.

Figure 5:
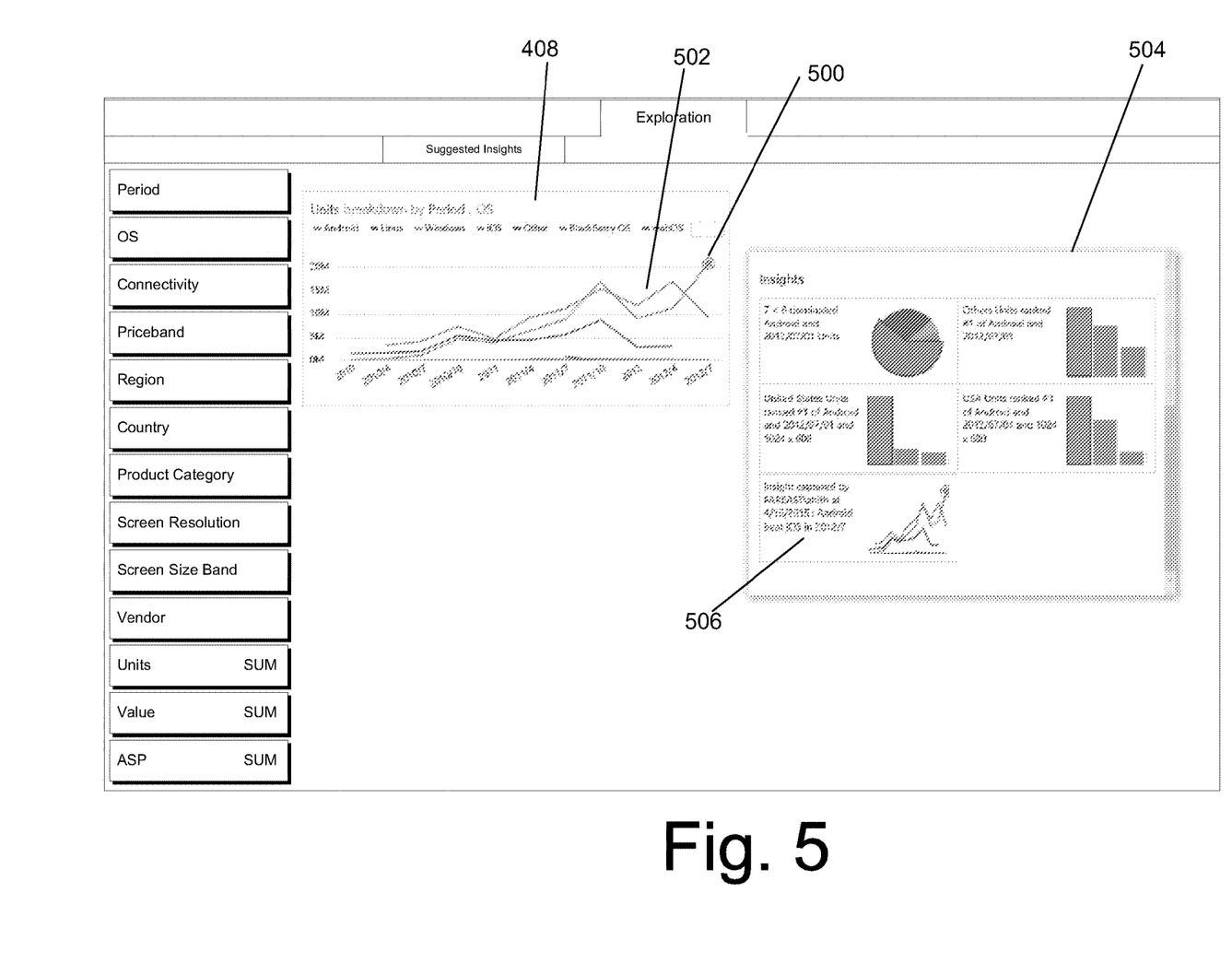
FIG. 5 shows a screenshot of an additional exploration canvas as a user interface.

As shown in FIG. 5, a user has selected a datapoint 500 of a graphical component 502 of the chart 408. As a result of the datapoint selection, the insight interface module 112 presents a plurality of insights in an insight window 504 adjacent to the chart 408. The presented insights are associated with the data subspace associated with the selected datapoint 500. In this example, the datapoint 500 is the number of Android units sold 2012/7. For example, some of the insights are United States Units ranked #1 of Android and 7<8 (screen size) dominated Android. The insights may also include insights produced and shared by other users, see insight 506.

Figure 6A:
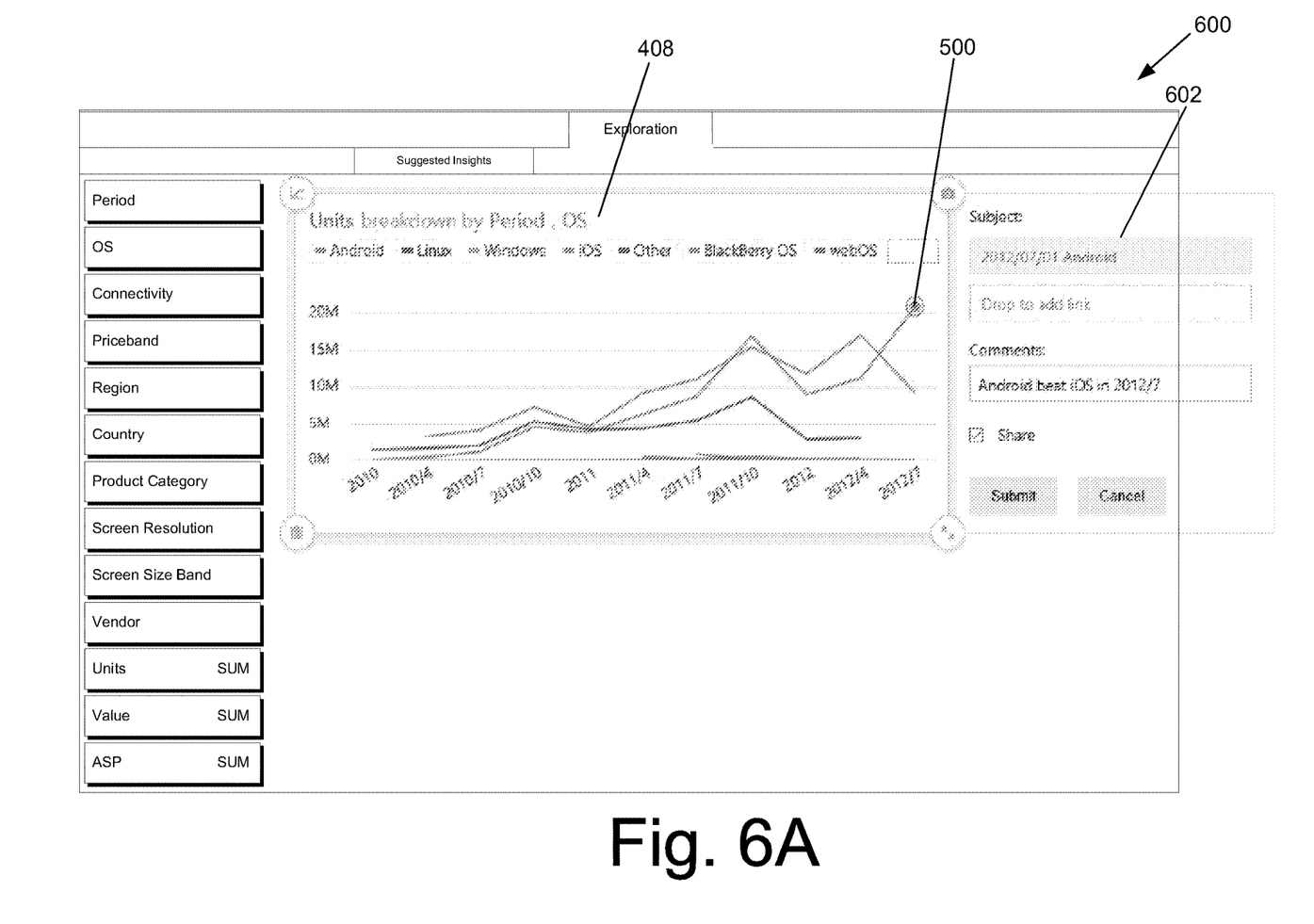
FIGS. 6A and 6B show screenshots of a user interface for allowing a user to enter an insight.

FIG. 6A shows a page 600 that allows a user to enter an insight. First, the user has selected the datapoint 500 on a graph component 502 of the chart 408. Second, the user selects a create insight action after which an insight creation window 602 is presented. The insight creation window 602 includes fields for allowing the user to view a subject title, enter a comment, indicate if they wish to share the insight.

Figure 6B:
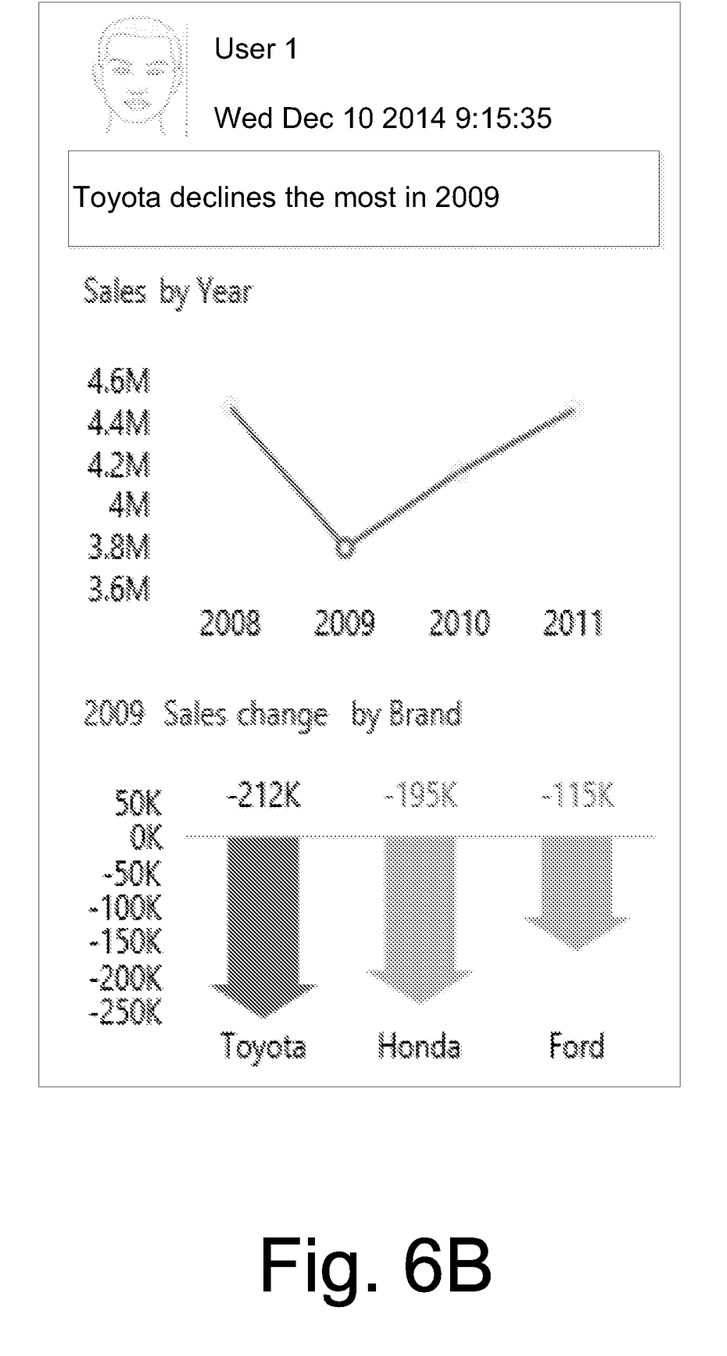

A user can drag a data point from another chart and drop it into a link field. This other chart is then linked to this to be created insight. Thus, the created insight will have two charts which are related. The relationship between the charts may be attribution, co-occurrence or a user defined relationship. For example, a user drags the year 2009 to the insight creation button, then drags the Toyota decline data point form another chart to the linked field. This is shown in FIG. 6B.

Figure 7:
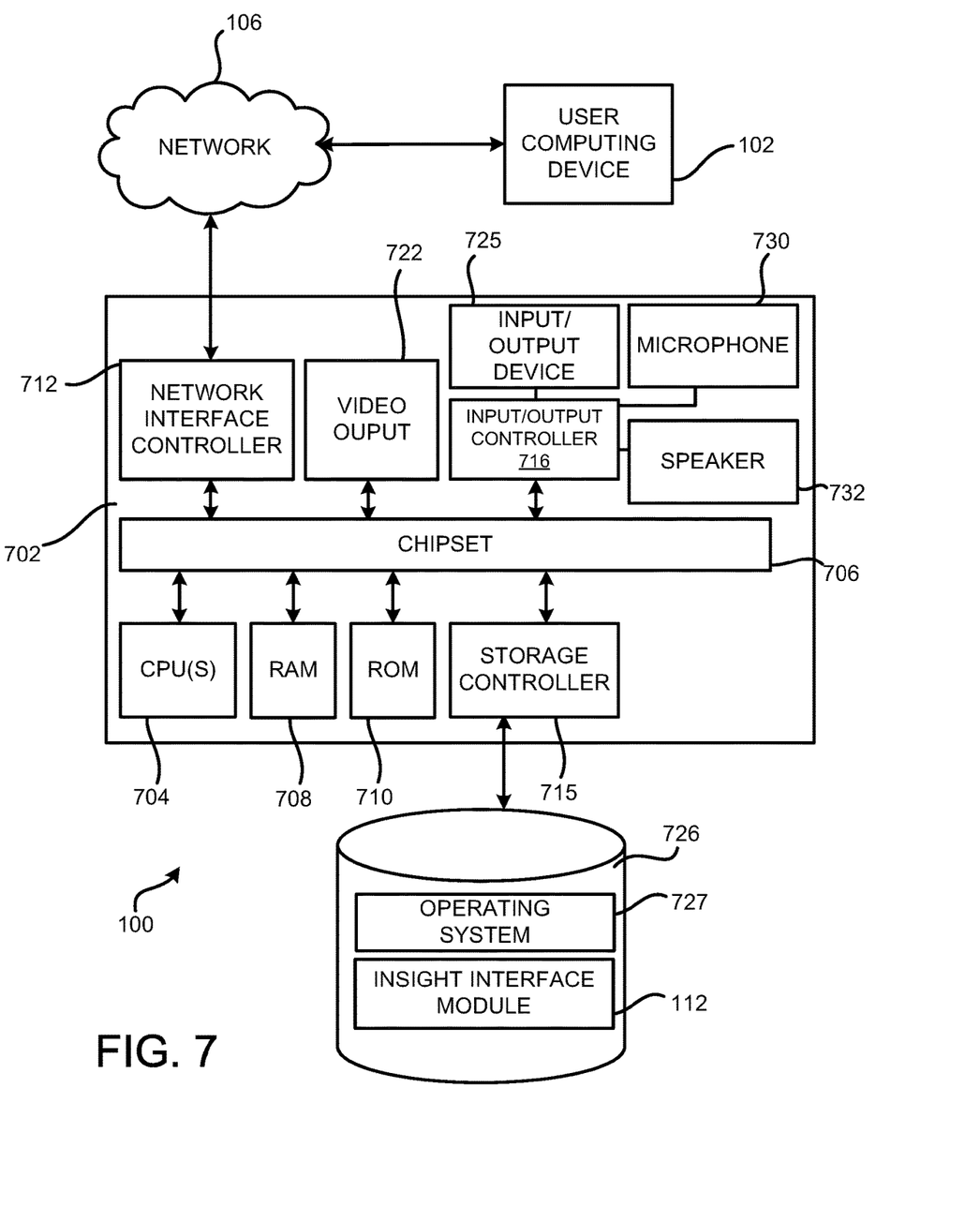
FIG. 7 is a block diagram of an example business intelligent computing device and remote user computing device, which implement the operations shown in FIG. 2.

FIG. 7 shows additional details of an example computer architecture, for the components shown in FIG. 1, capable of executing the program components described above for providing insight interaction. The computer architecture shown in FIG. 7 illustrates a console, conventional server computer, workstation, desktop computer, laptop, tablet, phablet, network appliance, personal digital assistant (PDA), e-reader, digital cellular phone, or other computing device, and may be utilized to execute any of the software components presented herein. For example, the computer architecture shown in FIG. 7 may be utilized to execute any of the software components described above. Although some of the components described herein are specific to the BI computing device 100, it can be appreciated that such components, and other components, may be part of the user computing device 102.

The BI computing device 100 includes a baseboard 702, or "motherboard," which is a printed circuit board to which a multitude of components or devices may be connected by way of a system bus or other electrical communication paths. In one illustrative example, one or more central processing units (CPUs) 704 operate in conjunction with a chipset 706. The CPUs 704 may be standard programmable processors that perform arithmetic and logical operations necessary for the operation of the BI computing device 100.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state, based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a RAM 708, used as the main memory in the BI computing device 100. The chipset 706 may further provide an interface to a computer-readable storage medium, such as a read-only memory (ROM) 710 or nonvolatile RAM (NVRAM) for storing basic routines that help to start up the BI computing device 100 and to transfer information between the various components and devices. The ROM 710 or NVRAM may also store other software components necessary for the operation of the BI computing device 100 in accordance with the examples described herein.

The BI computing device 100 may operate in a networked environment using logical connections to remote computing devices and computer systems through a network, such as the local area network 106. The chipset 706 may include functionality for providing network connectivity through a network interface controller (NIC) 712, such as a gigabit Ethernet adapter. The NIC 712 is capable of connecting the BI computing device 100 to other computing devices over the network 106. It should be appreciated that multiple NICs 712 may be present in the BI computing device 100, connecting the computer to other types of networks and remote computer systems. The network 106 allows the BI computing device 100 to communicate with remote services and servers, and the user computing device 102. In addition, as described above, the user computing device 102 may mirror and reflect data stored on the BI computing device 100 and host services that may provide data or processing for the techniques described herein.

The BI computing device 100 may be connected to a mass storage device 726 (e.g., the data store 104) that provides nonvolatile storage for the BI computing device 100. The mass storage device 726 may store system programs, application programs, other program modules, and data, which have been described in greater detail herein. The mass storage device 726 may be connected to the BI computing device 100 through a storage controller 715, connected to the chipset 706. The mass storage device 726 may consist of one or more physical storage units. The storage controller 715 may interface with the physical storage units through a serial attached SCSI (SAS) interface, a serial advanced technology attachment (SATA) interface, a fiber channel (FC) interface, or other type of interface for physically connecting and transferring data between computers and physical storage units. It should also be appreciated that the mass storage device 726, other storage media, and the storage controller 715 may include MultiMediaCard (MMC) components, eMMC components, secure digital (SD) components, PCI Express components, or the like.

The BI computing device 100 may store data on the mass storage device 726 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 726 is characterized as primary or secondary storage, and the like.

For example, the BI computing device 100 may store information at the mass storage device 726 by issuing instructions through the storage controller 715 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The BI computing device 100 may further read information from the mass storage device 726 by detecting the physical states or characteristics of one or more particular locations within the physical storage units.

In addition to the mass storage device 726 described above, the BI computing device 100 may have access to other computer-readable media to store and retrieve information, such as program modules, data structures, or other data. Thus, although the insight interface module 112, and other modules are depicted as data and software stored in the mass storage device 726, it should be appreciated that these components and/or other modules may be stored, at least in part, in other computer-readable storage media of the BI computing device 100. Although the description of computer-readable media contained herein refers to a mass storage device, such as a solid-state drive, a hard disk, or CD-ROM drive, it should be appreciated by those skilled in the art that computer-readable media can be any available computer storage media or communication media that can be accessed by the BI computing device 100.

Communication media include computer-readable instructions, data structures, program modules, or other data in a modulated data signal, such as a carrier wave or other transport mechanism and include any delivery media. The term "modulated data signal" means a signal that has one or more of its characteristics changed or set in a manner so as to encode information in the signal. By way of example, and not limitation, communication media include wired media, such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and nonvolatile, removable, and nonremovable media implemented in any method or technology for storage of information, such as computer-readable instructions, data structures, program modules, or other data. For example, computer media include, but are not limited to, RAM, ROM, EPROM, EEPROM, flash memory or other solid-state memory technology; CD-ROM, digital versatile disks (DVD), HD-DVD, BLU-RAY, or other optical storage; magnetic cassettes, magnetic tape, magnetic disk storage, or other magnetic storage devices; or any other medium that can be used to store the desired information and which can be accessed by the BI computing device 100. For purposes of the claims, the phrase "computer storage medium," and variations thereof, do not include waves or signals per se and/or communication media.

The mass storage device 726 may store an operating system 727 utilized to control the operation of the BI computing device 100. According to one example, the operating system comprises the Windows® operating system from Microsoft Corporation. According to further examples, the operating system may comprise the UNIX, Android, Windows Phone or iOS operating systems, available from their respective manufacturers. It should be appreciated that other operating systems may also be utilized. The mass storage device 726 may store other system or application programs and data utilized by the BI computing device 100, such as the insight interface module 112, and/or any of the other software components and data described above. The mass storage device 726 might also store other programs and data not specifically identified herein.

In one example, the mass storage device 726 or other computer-readable storage media are encoded with computer-executable instructions, which, when loaded into the BI computing device 100, transform the computer from a general-purpose computing system into a special-purpose computer capable of implementing the examples described herein. These computer-executable instructions transform the BI computing device 100 by specifying how the CPUs 704 transition between states, as described above. According to one example, the BI computing device 100 has access to computer-readable storage media storing computer-executable instructions, which, when executed by the BI computing device 100, perform the various routines described above with regard to FIG. 2 and the other figures. The BI computing device 100 might also include computer-readable storage media for performing any of the other computer-implemented operations described herein.

The BI computing device 100 may also include one or more input/output controllers 716 for receiving and processing input from a number of input devices, such as a keyboard, a mouse, a microphone, a headset, a touchpad, a touch screen, an electronic stylus, or any other type of input device. Also shown, the input/output controllers 716 are in communication with an input/output device 725. The input/output controller 716 may provide output to a display, such as a computer monitor, a flat-panel display, a digital projector, a printer, a plotter, or other type of output device. The input/output controller 716 may provide input communication with other devices such as a microphone 730, a speaker 732, game controllers, and/or audio devices. In addition, or alternatively, a video output 722 may be in communication with the chipset 706 and operate independent of the input/output controllers 716. It will be appreciated that the BI computing device 100 may not include all of the components shown in FIG. 7, may include other components that are not explicitly shown in FIG. 7, or may utilize an architecture completely different from that shown in FIG. 7.

EXAMPLE CLAUSES

A: A method comprising: receiving, at a computing device, a request for a dataset comprising a plurality of subspaces of a multi-dimensional data structure; receiving one or more insights based on the received request; presenting at least one of the one or more insights or a chart associated with the dataset on a display device associated with the computing device; receiving a selection of at least a portion of the presented one or more insights or a portion of the chart; receiving one or more contextual insights responsive to the selected portion; and presenting the one or more contextual insights, the one or more contextual insights comprise a textual description and a visualization.

B: The method of A, wherein the receiving the selection of at least the portion comprises: receiving a user interface action related to a first one of the one or more insights; and placing the first one of the one or more insights in an exploration area of a user interface in response to receiving the user interface action.

C: The method of B, wherein the placing comprises: presenting an image representing a portion of the subspaces associated with the first one of the one or more insights, wherein the image includes one or more data points, wherein the one or more data points correspond to the subspaces associated with the first one of the one or more insights.

D: The method of C, wherein the receiving the selection of at least a portion of the presented one or more insights comprises receiving a selection of the one or more data points.

E: The method of D, wherein the receiving the one or more contextual insights is further based on the received selection of the one or more data points.

F: The method of C, D or E, wherein the user interface action comprises a drag and drop action of a display area associated with the first one of the one or more insights.

G: The method of A, B, C, D, E or F, wherein the one or more insights and the one or more contextual insights comprises at least one manually-created insight created by a user who is different than a user of the computing device.

H: A computing apparatus comprising: a processor; a user interface device; a display device; and a memory storing instructions that, when executed by the processor, configure the apparatus to: receive a request for a dataset comprising a plurality of subspaces of a multi-dimensional data structure; receive one or more insights based on the received request; present at least one of the one or more insights or a chart associated with the dataset on the display device; receive a selection of at least a portion of the presented one or more insights or a portion of the chart based at least on operation of the user interface device; receive one or more contextual insights responsive to the selected portion; and present the one or more contextual insights on the display device, the one or more contextual insights comprise a textual description and a visualization.

I: The computing apparatus of H, wherein the receiving the selection of at least a portion comprises: receiving a user interface action related to a first one of the one or more insights; and placing the first one of the one or more insights in an exploration area on the display device in response to receiving the action.

J: The computing apparatus of I, wherein the placing comprises: presenting an image on the display device representing a portion of the subspaces associated with the first one of the one or more insights, wherein the image includes one or more data points, wherein the one or more data points correspond to the subspaces associated with the first one of the one or more insights.

K: The computing apparatus of J, wherein the receiving the selection of at least a portion of the presented one or more insights comprises receiving a selection of the one or more datapoints.

L: The computing apparatus of K, wherein the receiving the one or more contextual insights is further based on the received selection of the one or more data points.

M: The computing apparatus of I, J, K or L, wherein the user interface action comprises a drag and drop action, the drag and drop action comprises moving a display feature associated with the first one of the one or more insights to an action area.

N: The computing apparatus of I, J, K, L or M, wherein the one or more insights and the one or more contextual insights comprises at least one manually-created insight.

O: The computing apparatus of N, wherein the at least one manually-created insight is created by a user of another computing apparatus.

Based on the foregoing, it should be appreciated that technologies for providing action orchestration of computing entities in a complex network are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting.

Various modifications and changes may be made to the subject matter described herein without following the examples and applications illustrated and described, and without departing from the true spirit and scope of the present invention, which is set forth in the following claims.

What is claimed is:

1. A method comprising:
   receiving, at a computing device, a request for a dataset comprising a plurality of subspaces of a multi-dimensional data structure;
   presenting one or more insights associated with the request in a first portion of a user interface associated with the computing device;
   receiving a selection of a portion of the one or more insights;
   responsive to receiving the selection of the portion, presenting one or more contextual insights in a second portion of the user interface, wherein each contextual insight of the one or more contextual insights comprises:
      a visualization of a data subspace in the plurality of subspaces; and
      a textual description providing explanatory facts about the data subspace with respect to the visualization, the textual description being separate from the visualization;
   receiving, in the second portion of the user interface, a comment from a first user about the one or more contextual insights;
   associating the comment with the one or more contextual insights such that the comment is displayed in the second portion of the user interface with the one or more contextual insights; and
   presenting the one or more contextual insights with the comment when the one or more contextual insights are accessed.

2. The method of claim 1, wherein the receiving the selection of at least the portion of the one or more insights comprises:
   receiving a user interface action related to a first one of the one or more insights; and
   placing the first one of the one or more insights in an exploration area of the user interface in response to receiving the user interface action.

3. The method of claim 2, wherein the placing comprises:
   presenting an image representing a portion of the subspaces associated with the first one of the one or more insights, wherein the image includes one or more data points corresponding to the subspaces associated with the first one of the one or more insights.

4. The method of claim 3, wherein the receiving the selection of a portion of the one or more insights comprises receiving a selection of the one or more data points.

5. The method of claim 4, wherein the one or more contextual insights are received in response to the received selection of the one or more data points.

6. The method of claim 2, wherein the user interface action comprises a drag and drop action of a display area associated with the first one of the one or more insights.

7. The method of claim 1, wherein the one or more insights and the one or more contextual insights comprises at least one manually-created insight created by a second user who is different from the first user.

8. A computing apparatus comprising:
   a processor; and
   a memory storing instructions that, when executed by the processor, configure the computing apparatus to:
      receive a request for a dataset comprising a plurality of subspaces of a multi-dimensional data structure;
      automatically present one or more insights associated with the request in a first portion of a user interface associated with the computing apparatus;
      receive a first selection of an exploration area selection item associated with a first insight of the one or more insights;
      in response to the first selection, present the first insight in a second portion of the user interface;
      receive a second selection of a portion of the first insight;
      responsive to receiving the second selection of the portion, present one or more contextual insights in third portion of the user interface, wherein each contextual insight of the one or more contextual insights comprises:
         a visualization of a data subspace in the plurality of subspaces; and
         a textual description providing explanatory facts about the data subspace with respect to the visualization, the textual description being separate from the visualization;
      receive, in the third portion of the user interface, a comment from a user about the one or more contextual insights;
      associate the comment with the one or more contextual insights such that the comment is displayed in the third portion of the user interface with the one or more contextual insights; and
      present the one or more contextual insights with the comment when the one or more contextual insights are accessed.

9. The computing apparatus of claim 8, wherein:
   to automatically present one or more insights comprises displaying the first insight and a second insight; and
   to receive a first selection of an exploration area selection item comprises receiving a selection of an icon displayed with the one or more insights.

10. The computing apparatus of claim 9, wherein to present the first insight comprises:
    presenting an image representing a portion of subspaces associated with the first insight, wherein the image includes one or more data points corresponding to the subspaces associated with the first insight.

11. The computing apparatus of claim 10, wherein to receive the second selection of the portion of the first insight comprises receiving a selection of the one or more data points.

12. The computing apparatus of claim 11, wherein the one or more contextual insights are received in response to the received selection of the one or more data points.

13. The computing apparatus of claim 8, wherein operation of the user interface comprises a drag and drop action that comprises moving a display feature associated with the first insight to an action area.

14. The computing apparatus of claim 8, wherein the one or more insights and the one or more contextual insights comprise at least one manually-created insight.

15. The computing apparatus of claim 14, wherein the at least one manually-created insight is created by a second user of another computing apparatus.

16. A tangible computer readable medium, not consisting of a propagated data signal, having stored thereon instructions that when executed by a processor cause the processor to conduct a method, the method comprising:
- receiving a request for a dataset comprising a plurality of subspaces of a multi-dimensional data structure;
- presenting a first insight and a second insight associated with the dataset in a first user interface on a display device;
- receiving a first selection of an icon associated with the first insight;
- in response to the first selection, presenting the first insight in a second user interface on the display device;
- receiving a selection of a portion of the first insight;
- responsive to receiving the selection of the portion of the first insight, presenting one or more contextual insights in a third user interface on the display device, wherein each contextual insight of the one or more contextual insights comprises:
  - a visualization of a data subspace in the plurality of subspaces; and
  - a textual description providing explanatory facts about the data subspace with respect to the visualization, the textual description being separate from the visualization;
- receiving a comment, from a user, about the one or more contextual insights;
- associating the comment with the one or more contextual insights such that the comment is displayed with the one or more contextual insights; and
- presenting the one or more contextual insights with the comment when the one or more contextual insights are accessed.

17. The tangible computer readable medium of claim 16, wherein the second user interface is an exploration area that displays the first insight.

18. The tangible computer readable medium of claim 17, wherein the presenting the first insight in the second user interface comprises:
- presenting an image representing a portion of the subspaces associated with the first insight, wherein the image includes one or more data points corresponding to the subspaces associated with the first insight.

19. The tangible computer readable medium of claim 18, wherein the receiving the selection a portion of the first insight comprises receiving a selection of the one or more data points.

20. The tangible computer readable medium of claim 19, wherein the one or more contextual insights are received in response to the received selection of the one or more data points.

* * * * *